Aug. 3, 1926.                                         1,594,880
E. F. HATHAWAY ET AL
YARN SPOOL BEARING FOR TUBE FRAMES
Filed Oct. 4, 1923
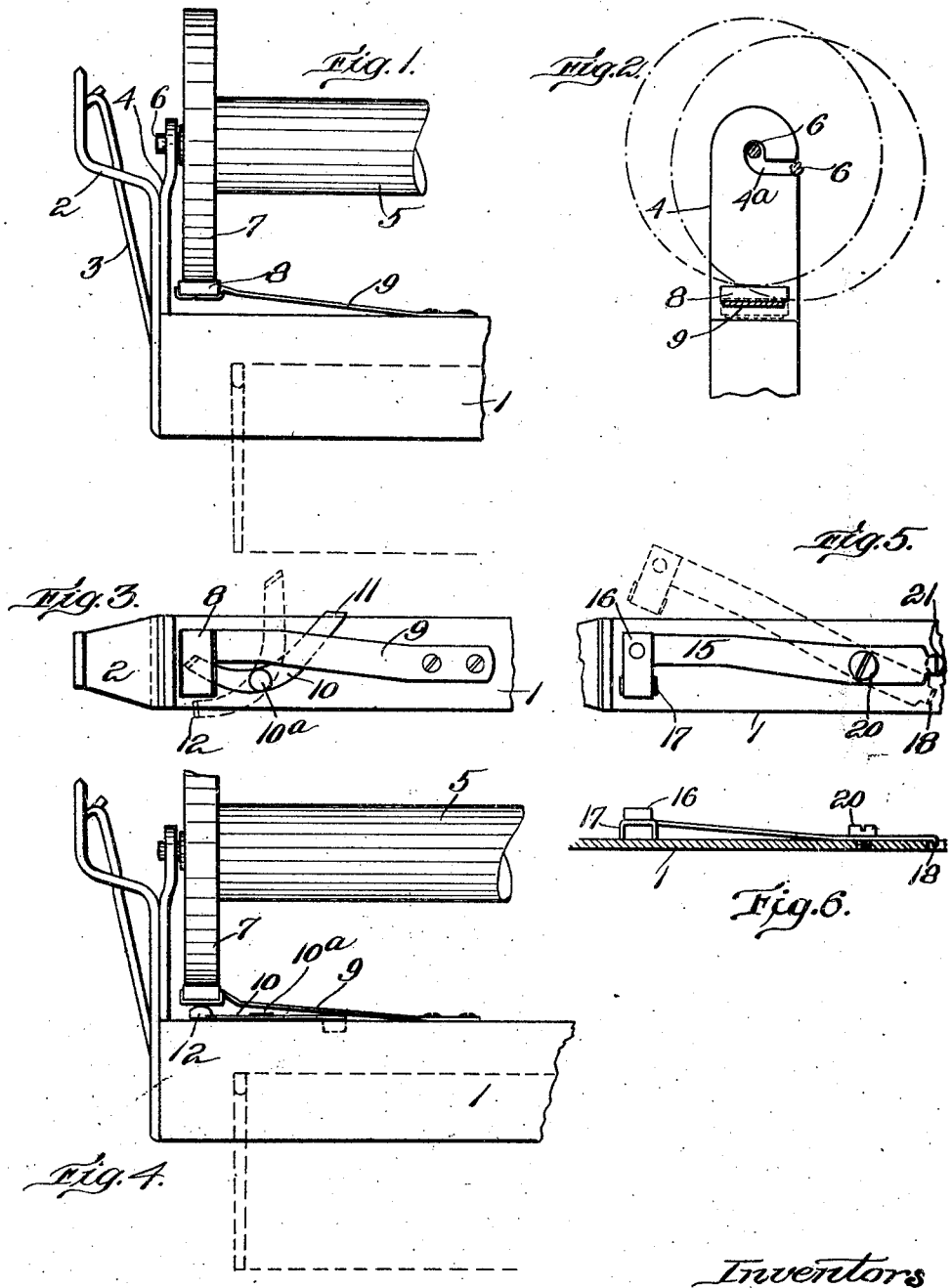

Patented Aug. 3, 1926.

1,594,880

UNITED STATES PATENT OFFICE.

EDGAR F. HATHAWAY, OF WELLESLEY, AND WALTER BIXBY, OF BOSTON, MASSACHU-SETTS, ASSIGNORS TO SHAWMUT ENGINEERING COMPANY, OF BOSTON, MASSA-CHUSETTS, A CORPORATION OF MASSACHUSETTS.

YARN-SPOOL BEARING FOR TUBE FRAMES.

Application filed October 4, 1923. Serial No. 666,613.

This invention relates to tube frame construction, and particularly concerns the construction and arrangement of the bearing by which the yarn-spool which supplies the tuft yarn to the tuft tubes of the frame is effectively supported in its bearing brackets in such a manner as to make practical the quick and easy removal or insertion of the yarn-spool from time to time.

To meet this need it has been proposed to provide special means, such as latches, keepers or the like, to hold the journal in an open bearing slot. The present invention, however, is based upon a novel principle that does not necessitate the use of any special devices of that sort, but accomplishes the desired result by so forming and disposing the bearing slot in coordination with the commonly used form of spool brake so that the attendant can readily insert the spool in its bearings and remove the same without requiring the use of his hands to manipulate any special catches or locking elements. While in its simplest form the invention requires no such special locking devices, yet it may be used in conjunction with locking detents or stops in association with the brake element to make positive provision against accidentally displacing the spool in its bearing in case pressure should be brought to bear on the spool in opposition to the action of the brake element.

These and other features of the invention will be explained in the following specification and will be defined in the claims hereto annexed.

In the accompanying drawings we have illustrated a construction and arrangement embodying the principles of this invention, in which:

Figure 1 is a front elevation of one end of a tube frame equipped with our improvement.

Figure 2 is a side elevation of the spool-supporting bracket showing the brake element in section.

Figure 3 is a plan view with the spool removed showing one form of the brake stop.

Figure 4 is a side elevation showing the form illustrated in Figure 3 in conjunction with the yarn-spool.

Figure 5 shows a plan view of a modified construction for limiting the brake movement.

Figure 6 is a front elevation of the brake element shown in Figure 5.

The tube frame shown in the drawing embraces the longitudinal carrier bar 1, with the end-supporting brackets comprising an offset and upwardly projecting main arm 2, which, in conjunction with the movable hook arm 3, serves to releasably suspend the tube frame from the usual traveling chain carrier.

In the practice of the present invention the spool-supporting bracket 4, which projects upward beyond the offset portion of the suspension arm 2, is provided with a bearing slot or aperture $4^a$, of angular form which opens through one edge of the spool-supporting bracket 4, to admit the journal 6 of the yarn spool 5.

According to the usual practice, the yarn-spool has an enlarged disk-like head 7, whose periphery is engaged by a brake pad 8, supported to be spring-pressed upward against the lower side of the spool head in any suitable manner, as by a leaf spring arm 9.

It will be observed that in order to insert the journal in its open bearing aperture the spool head is brought into contact with the brake pad and pressed downwardly so as to bring the journal into position to enter the open side or lower portion of the open bearing slot $4^a$, so that the spool can be pushed inward to the upwardly extending branch of the slot or bearing which forms the bearing recess proper. The upward thrust of the brake against the lower side of the spool forces the journal against the closed or upper end of the bearing recess and acts to normally maintain the journal in such position. To remove the spool it is merely necessary for the operator, in grasping the spool, to press downward so as to depress the spring and allow the journal to pass out of the lateral branch of the slot. For ordinary service under ordinary conditions, the above described construction is adequate to maintain the spool in correct operative position in its bearing. As it is not necessary to use this releasable bearing construction at both ends of the spool, the companion bearing bracket for supporting the other end of the spool is not shown, it being of the usual type containing the usual circular perforation fitting the bearing journal.

Under some conditions it may be found desirable to provide a positive lock or stop for preventing accidental displacement of the bearing journal due to downward pressure on the spool or brake. Accordingly Figures 3 and 4 illustrate the application of such a locking or stop device to the removable bearing construction above described. In this case an arm 11, is pivotally secured to the top of the carrier bar 1, by means of a fastening stud or screw 10ª, with its outer end preferably underlying the brake pad, and provided with an upturned lip 12 of sufficient height to prevent the brake spring from being depressed sufficiently to allow the journal to drop to the inlet and outlet portion of the bearing aperture. At its free end the stop member is provided with a downwardly projecting lip or flange 11, which, in normal operative position, engages the back face of the carrier bar 1, to limit the swinging movement of the stop 10 to operative position, while permitting it to be swung on its axis to inoperative position which is indicated in dotted lines in Figure 3.

Another form of stop for preventing or limiting the downward movement of the spring-actuated brake is shown in Figures 5 and 6. In this case the brake arm 15, is pivoted on the spool stud 20, and has secured to its outer end, in line with the spool head, a usual brake pad 16 which also carries a downwardly bent stop member 17, of channel or angle plate secured to the brake, and of sufficient depth to prevent enough downward movement of the brake to allow the egress of the spool journal when the brake is in operative position for service. In this case, to withdaw the spool from its bearing, the brake arm 15 is swung outward beyond the carrier bar, as indicated in dotted lines in Figure 5, so as to no longer afford an obstruction to the lowering of the spool journal to its exit slot. The inner end of the brake arm 15 may be formed with a short downwardly extending lip 18, adapted to engage a recess or aperture 21 in the top of the carrier bar.

What we claim is:

1. In a tube frame the combination of a longitudinal carrier-bar, of spool-bearing suspension brackets secured to the ends of said carrier-bar, said brackets being formed with journal bearing apertures, one of which is closed at the top and open at the side to permit withdrawal of the inserted spool journal, a yarn spool journaled in said bearings, a spool retarding arm mounted on said carrier-bar with its free ends normally pressed against one of the heads of said spool to retard its rotation and maintain the spool journal in the upper portion of said open bearing, substantially as described.

2. In a tube frame for tuft weaving, the combination of a longitudinal carrier-bar, spool-bearing suspension brackets secured to the opposite ends of said carrier-bar and formed with bearing apertures for the rotation of yarn-spool journals, one of said bearing apertures being in the form of an L shaped slot with its closed end uppermost, and a brake arm secured to the carrier-bar with its free end under spring tension to press against the under side of the spool head, thereby retarding the rotation of the spool and maintaining it against displacement from its open bearing, substantially as described.

3. In a tube-frame, the combination of a longitudinal carrier-bar having suspension end brackets provided with bearing apertures for the support of a yarn-spool, one of said bearing apertures being in the form of a slot opening laterally below its uppermost point, and a spring brake arm secured to the top of the said carrier-bar and provided at its free end with a brake-pad which is normally pressed against the under side of the periphery of the spool-head, substantially as described.

4. In a tube frame, the combination of a rotatable yarn spool, a bearing bracket provided with an open slot bearing aperture, a spool-brake arranged to exert pressure on the spool in a direction to prevent egress of the spool-journal through the open side of its bearing, and means to prevent the brake from yielding sufficiently to allow the accidental escape of the journal from its bearing, substantially as described.

5. In a tube frame, the combination of a rotatable yarn-spool, a spool-supporting bracket provided with an open bearing for the reception of the spool-journal, a spool-brake normally acting through pressure against the spool to retain the spool-journal in operative position in its bearing, and a stop member arranged to positively limit the movement of the brake to prevent the escape of the spool from its bearing, substantially as described.

6. In a tube frame, the combination of a rotatable yarn-spool, a spool-supporting bracket provided with a bearing aperture open on one side to admit the spool-journal, a spool-brake arranged to press against the spool in a direction to confine the spool-journal in the closed end of the bearing aperture, a stop carried by the tube frame and movable into and out of operative position to prevent movement of the brake in a direction permitting the release of the journal from its bearing, substantially as described.

7. In a tube frame, the combination of a tuft tube carrier-bar, a cooperative yarn-spool, a bearing-bracket supported by the carrier bar and having an open bearing orifice for the reception of the spool-journal, a brake mounted on the carrier bar to exert a braking pressure against the spool and retain the spool in its bearing, and a stop member pivotally mounted on the carrier bar to be moved into and out of stop position between the brake and the carrier bar to limit movement of the brake away from the spool, substantially as described.

In witness whereof, we have subscribed the above specification.

EDGAR F. HATHAWAY.
WALTER BIXBY.